United States Patent
Marwah

(10) Patent No.: US 7,634,510 B2
(45) Date of Patent: Dec. 15, 2009

(54) METHOD AND SYSTEM FOR TIME-BASED RECLAMATION OF OBJECTS FROM A RECYCLE BIN IN A DATABASE

(75) Inventor: Vineet Marwah, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 331 days.

(21) Appl. No.: 10/959,565

(22) Filed: Oct. 5, 2004

(65) Prior Publication Data

US 2006/0074956 A1      Apr. 6, 2006

(51) Int. Cl.
    *G06F 17/30* (2006.01)
(52) U.S. Cl. .................. 707/202; 707/206; 707/103
(58) Field of Classification Search ............. 707/202, 707/103
    See application file for complete search history.

(56) References Cited

U.S. PATENT DOCUMENTS

| | | | |
|---|---|---|---|
| 6,611,836 B2 * | 8/2003 | Davis et al. ................. 707/10 |
| 6,792,435 B1 * | 9/2004 | Ruddy ........................ 707/202 |
| 2004/0010542 A1 * | 1/2004 | Kumar et al. ............... 709/203 |
| 2004/0138898 A1 * | 7/2004 | Elbrader ..................... 705/1 |
| 2004/0243624 A1 * | 12/2004 | Marwah ..................... 707/103 R |

OTHER PUBLICATIONS

"IBM DB2 Object Restore Version 1.3." Db2 Information Management Software. 2003. <http://www-306.ibm.com/software/data/db2imstools/pdf/edmodule-db2objresv13.pdf/>.*
"IBM DB2 Object Restore for Z/OS." Db2 Information Management Software. 2003. <http://www-306.ibm.com/software/data/db2imstools/pdf/edmodule-db2objresv13.pdf>.*
IBM's User's Guide. "IBM DB2 Log Analysis Tool for Z/OS", Version 2.1, 2003.*
RedBooks "DB2 Object Restore for z/OS V1.2", International Technical Support Organization, 2002.*

* cited by examiner

*Primary Examiner*—Charles Rones
*Assistant Examiner*—Yuk Ting Choi
(74) *Attorney, Agent, or Firm*—Townsend and Townsend and Crew LLP

(57) ABSTRACT

A system for managing dropped objects of a database. The system comprises a finite amount of disk space for temporarily storing the dropped objects. The system further includes an indexer for assigning time stamps to each of the dropped objects and a reclaimer for reclaiming the dropped objects based on their time stamps. These time stamps can also be used to guarantee the amount of time the object remains in the recycle bin.

15 Claims, 9 Drawing Sheets

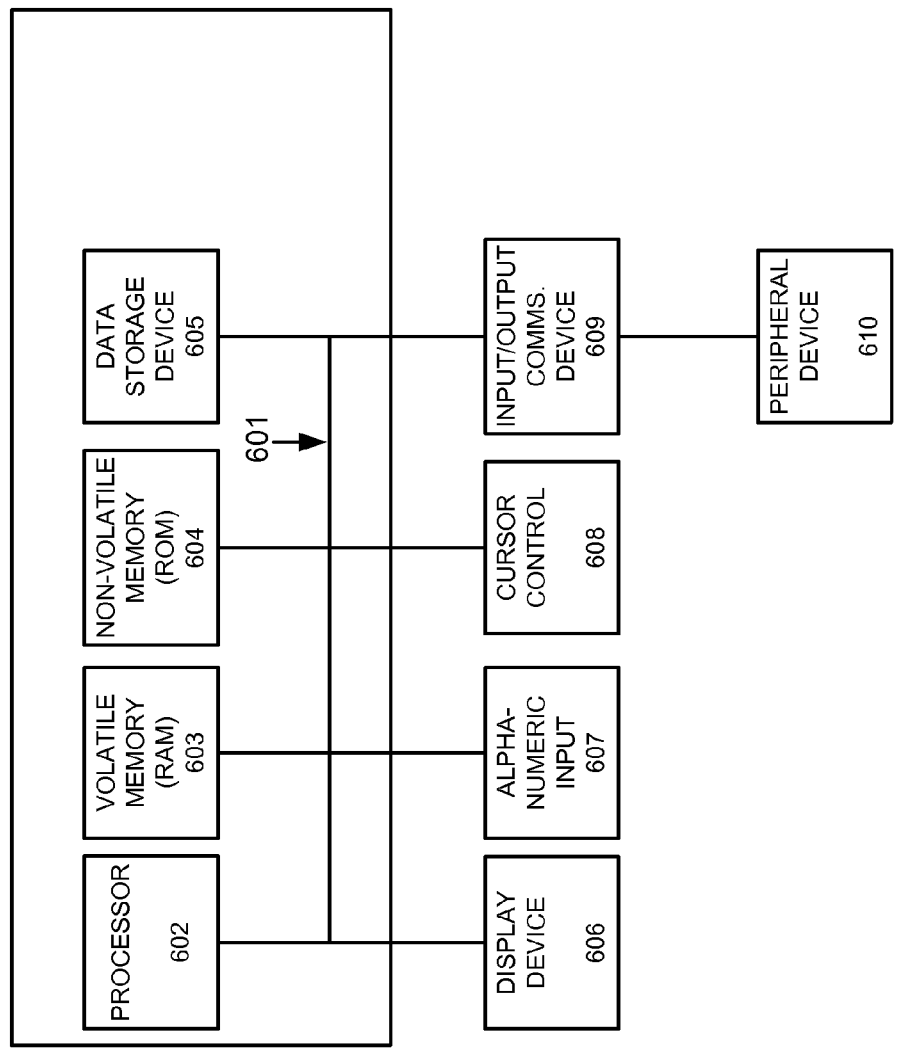

METHOD AND SYSTEM FOR TIME-BASED RECLAMATION OF OBJECTS FROM A RECYCLE BIN IN A DATABASE

CROSS REFERENCE TO RELATED APPLICATIONS

This Application is related to U.S. patent application Ser. No. 10/445,793 by Vineet Marwah, filed on May 27, 2003, entitled "Undrop Objects And Dependent Objects In A Database System,", assigned to the assignee of the present invention, and hereby incorporated by reference in its entirety.

TECHNICAL FIELD

The field of the invention relates to computer system data storage management. More specifically, embodiments of the invention relates to time-based reclamation of objects from a database recycle bin.

BACKGROUND ART

Conventionally, a database management system (DBMS) is the computer software that controls the organization, storage, retrieval, security, and integrity of information in a database. Typically, information in a database can be stored utilizing numerous types of objects. For example, information can be stored in tables and access to tables can be facilitated by indices. Other common objects include nested tables, partial tables, index organized tables (IOTs), large objects (LOBs), constraints, triggers and the like.

For any number of reasons, a user may decide to drop the object or group of related objects. For example, the user may feel that the object is no longer necessary, to make more storage space available, or it may be accidental. Regardless of the reason for the drop, a user occasionally needs to recover the objects that have been dropped.

With conventional database applications, the current state of the database is periodically stored. Additionally, a list of transactions that are performed on the database since that state is also stored. When a user decides to retrieve an object that was dropped, the database is rolled-back to the last stored state. After the roll-back, the transactions that were performed after the state was stored can be executed from the list of transactions.

Although this solution can retrieve a dropped object, it is very time consuming. More importantly, during the rollback and roll forward, many times new transactions cannot be processed.

Another approach to manage dropped objects is to use a recycle bin for temporarily storing the dropped items. However, due to space limitations, the recycle bin will only hold objects until there is a storage space requirement and objects need to be purged (or reclaimed) from it periodically.

One problem with this solution is that there is no particular order for which the objects in a recycle bin are purged and as a result, recycle bin items are purged arbitrarily. A user may decide to recover an object from a recycle bin and find that the object was already reclaimed by the system for space requirements.

SUMMARY OF THE INVENTION

A system and method that utilize time-based reclamation of objects from a recycle bin would be an improvement over the art. Accordingly, a system and method for time-based reclamation of objects from a recycle bin are disclosed.

Embodiments of the present invention include a system for managing dropped objects of a database. The system comprises a finite amount of disk space for temporarily storing the dropped objects. The system further includes an indexer for assigning time stamps to each of the dropped objects and a reclaimer for reclaiming the dropped objects based on the time stamps in a first in first out (FIFO) order. According to embodiments of the present invention, a time for which objects will remain in the recycle bin can be guaranteed since there is a time associated with each object in the recycle bin.

In one embodiment of the invention, objects of a database recycle bin are time stamped according to the order they are assigned to the recycle bin. When disk space is needed, the oldest objects in the recycle bin are purged first to free the required amount of space. In one embodiment of the invention, objects are preserved in the recycle bin until disk space is required. In another embodiment of the invention, objects in the recycle bin are preserved for a predetermined period of time before being a candidate for purging, thereby guaranteeing a minimum time before an object is purged from the recycle bin.

In another embodiment of the invention, all objects in the recycle bin are stamped with a time that it was placed in the recycle bin. The time stamp can be used to have an ordering of the objects in the bin. At a time of space pressure, the objects are selected in the order in which they were dropped (e.g., added to the recycle bin). In one embodiment of the invention, dependent objects (e.g., indexes) are given an older (e.g., earlier) time stamp than the associated tables, so that the dependent objects are purged first, thus preserving the dropped object as long as possible since these dependent objects can be created again. In one embodiment of the invention, the dependent objects can be re-created after being purged if the associated table is still preserved. In another embodiment of the invention, only the fewest number of items of the recycle bin are purged as is required to relieve the immediate space pressure.

Since objects in the recycle bin are logically organized based on the time they were placed into the bin, embodiments of the invention guarantee a minimum duration that an object stays in the bin before it can be purged.

BRIEF DESCRIPTION OF THE DRAWINGS

The above and other objects and advantages of the present invention will be more readily appreciated from the following detailed description when read in conjunction with the accompanying drawings, wherein:

FIG. 6 is a block diagram of an exemplary computer system, which can be used as a platform for embodiments of the present invention.

DETAILED DESCRIPTION OF THE INVENTION

Figure 1:
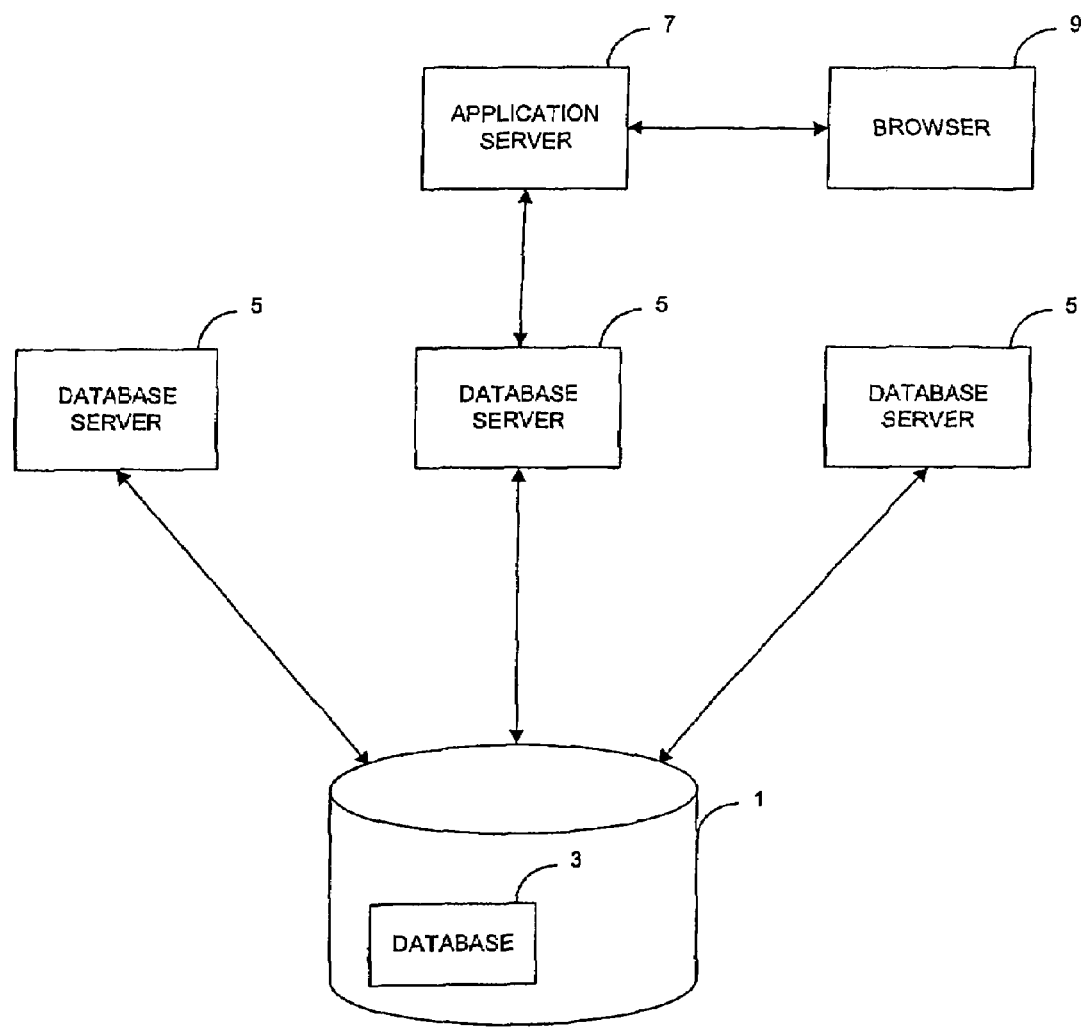
FIG. 1 is a block diagram of an exemplary database management system in a three-tiered configuration in accordance with embodiments of the present invention.

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents, which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions, which follow, are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention (e.g., process 300 and 500), discussions utilizing terms such as accessing, requesting, determining, assigning, purging, reclaiming, reconstructing, generating or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In one embodiment of the invention, objects of a database recycle bin are, time stamped according to the order they are assigned to the recycle bin. When disk space is needed, the oldest objects in the recycle bin are purged first to free the required space. In one embodiment of the invention, objects are preserved in the recycle bin until disk space is required. In another embodiment of the invention, objects in the recycle bin are preserved for a predetermined period of time before becoming candidates for purging.

In another embodiment of the invention, all objects in the recycle bin are stamped with a time that it was placed in the recycle bin. The time stamp can be used to maintain an ordering of the objects in the bin. At a time of space pressure, the objects are selected in the order in which they were dropped (e.g., added to the recycle bin). In one embodiment of the invention, dependent objects (e.g., indexes) are given an older time stamp than the associated tables, so that the dependent objects are purged first. In one embodiment of the invention, the dependent objects can be re-created (if needed) after being purged if the associated table is still preserved in the recycle bin. In another embodiment of the invention, only a minimum number of items of the recycle bin are purged as is required to relieve the immediate space pressure. In another embodiment of the invention, objects are guaranteed to remain in the recycle bin for a predetermined period of time.

FIG. 1 is a block diagram of an exemplary database management system in a three-tiered configuration in accordance with embodiments of the present invention. At the core of the database management system is a central storage 1 that stores a database 3. In one embodiment of the invention, database 3 is stored on one or more hard drives, which can be part of a larger computer system. The information can be stored on database 3 in a variety of formats with relational database management systems relying heavily on tables to store information.

Database servers 5 are instances of a program that interacts with database 3. Each instances of the database server can, among other things, independently query database 3 and store information therein. Database server 5 may not include user-friendly interfaces, such as a graphical user interface.

Accordingly, one or more application server 7 can provide the user interfaces to the database server 5. For example, application server 7 can be a web application server on the Internet (or other network). Application server 7 can provide user-friendly mechanisms for accessing database 3 through database server 5. A web browser 9 can be utilized to access application server 7.

Figure 2A:
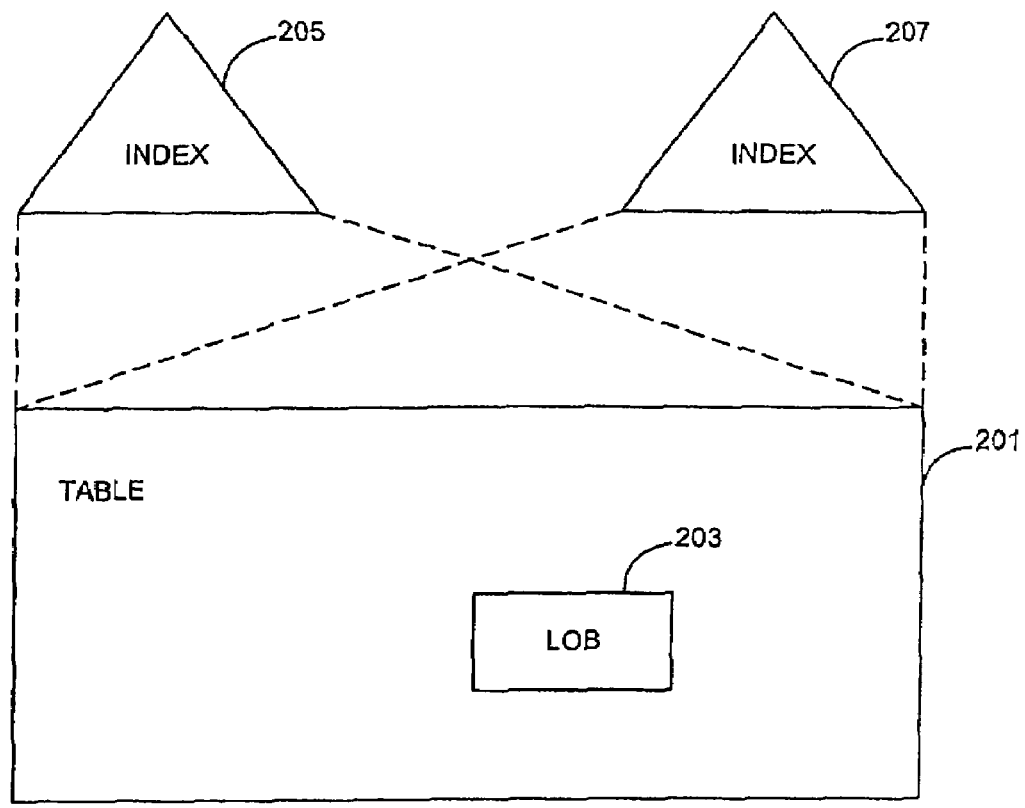
FIG. 2A is a block diagram of an exemplary table and related objects in accordance with embodiments of the present invention.

FIG. 2A is a block diagram of an exemplary table and related objects in accordance with embodiments of the present invention that can be placed in a recycle bin. Table 201 comprises a large object (LOB) 203. A Table is a common object that is used to store information in a database. The information is typically stored in fields of the table and can include data types such as numbers, strings, pointers, nested tables, and the like.

For illustration purposes, LOB 203 is shown to represent another type of data that may be stored in a table. LOBs can store information such as binary, images and sound files. In order to more efficiently access table 201, indices 205 and 207 are shown. Indices typically utilize key fields to more efficiently access a table. All of these objects may reside as separate linked files in the database system.

LOB 203 and indices 205 and 207 are examples of dependent objects because they are dependent on another object (e.g., table 201 in this case). They are dependent objects because without the object to which they depend, the dependent objects may be of little or no value.

Some dependent objects are re-constructible, meaning that if the dependent object is purged, it can be recreated. Indices 205 and 207 are examples of dependent objects that can be recreated. LOB 203 is an example of an object that typically cannot be recreated once purged. Other examples of dependent objects include constraints and triggers, and embodiments of the present invention can advantageously apply to any type of dependent object.

Figure 2B:
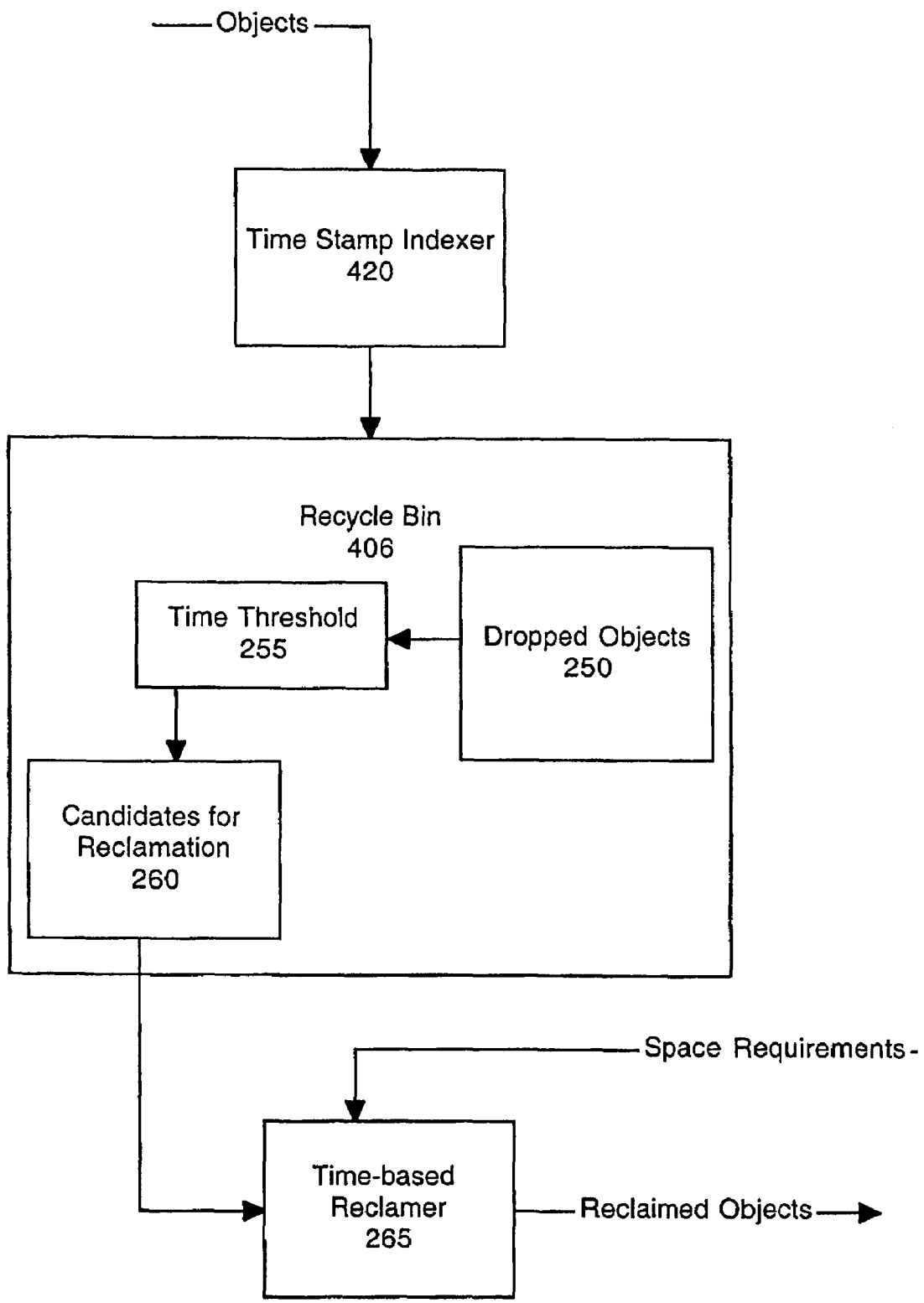
FIG. 2B is a block diagram of an exemplary system for organizing objects in a recycle bin according to the time they were placed in the recycle bin according to embodiments of the present invention.

FIG. 2B is a block diagram of an exemplary system for preserving an object in a database recycle bin for a predetermined period of time in accordance with embodiments of the present invention. As objects are assigned (e.g., dropped) to the recycle bin 406, they are assigned a time stamp by the time stamp indexer 420.

In some cases, it is beneficial to have a time threshold 225 for which an object must pass to become a candidate for reclamation. For example, a time threshold 225 can be established that preserves financial information for a period of 1 year. In this embodiment of the invention, the recycle bin 406 classifies objects as dropped objects 250 and candidates for reclamation 260. For an object to become a candidate for reclamation 260 it must pass the time threshold 255. Before a dropped object passes the time threshold 255, it cannot be reclaimed from the recycle bin 406. In one embodiment of the invention, the candidates for reclamation 260 are automatically reclaimed by the time-based reclaimer 265. For example, an object is reclaimed after residing in the recycle bin for 1 year. In another embodiment of the invention, the candidates for reclamation are reclaimed according to space requirements. For example, if 20 megabytes is required, 20 megabytes of objects are reclaimed from the candidates for reclamation 260, wherein the objects with the oldest time stamps are reclaimed first. In this embodiment of the invention, only the fewest amount of the candidates for reclamation 260 are reclaimed to satisfy the space requirements.

Figure 3:
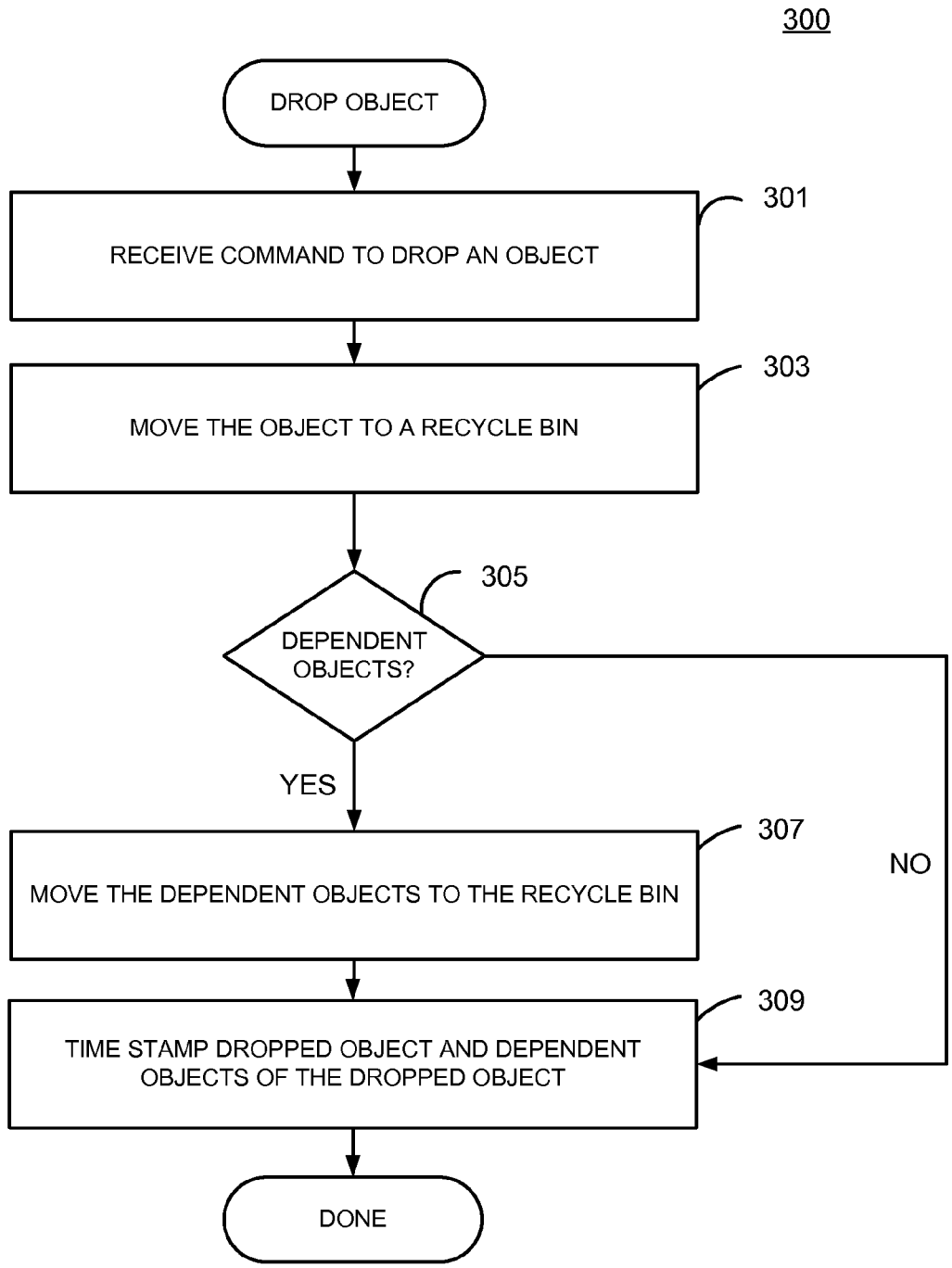
FIG. 3 is a flow diagram of an exemplary computer controlled process for dropping an object from a database in accordance with embodiments of the present invention.

FIG. 3 is a flow diagram of an exemplary process 300 of dropping an object from a database (e.g., dropping into the recycle bin) in accordance with embodiments of the present invention. Step 301 comprises receiving a command to drop an object. The command is typically received from a user and may be input through an interface such as a graphical user interface or by a command line. By dropping the object, the user is indicating that they believe the object (e.g., table) will no longer be needed.

The object is moved or assigned to a recycle bin in step 303. The recycle bin is a repository that temporarily stores objects that have been dropped until a user undrops them or a user explicitly purges them or the database purges (e.g., reclaims) them in order to acquire more space. Moving the object can be performed by changing variables that define the contents of in the recycle bin.

In some embodiments of the present invention, the recycle bin is implemented as a dictionary table. When an object is dropped, an entry is made in this table and these objects can be undropped. The disk space for the objects in the recycle bin may still be allocated to the appropriate user even though they are dropped.

At step 305, it is determined whether there are any dependent objects that depend on the object that has been dropped. If there are dependent objects, the dependent objects are automatically moved to the recycle bin at step 307. For example, referring back to FIG. 2A, if a user indicated that table 201 should be dropped, the system would identify LOB 203 and indices 205 and 207 as dependent objects on table 201 so they would be automatically moved or assigned to the recycle bin.

With reference to FIG. 3, upon moving the object and dependent objects to the recycle bin, all dropped objects are assigned a time stamp corresponding to the time they were dropped in step 309. In one embodiment of the invention, the dependent objects that depend from a dropped object are assigned an earlier (e.g., older) time stamp than the dropped object so that they will be purged first. For example, referring back to FIG. 2A, the indices 205 and 207 would be given an earlier time stamp than the LOB 203. Furthermore, the LOB 203 would be assigned an earlier time stamp than the table 201. The earlier the time stamp, the older the item is with respect to its age in the recycle bin.

Figure 4A:
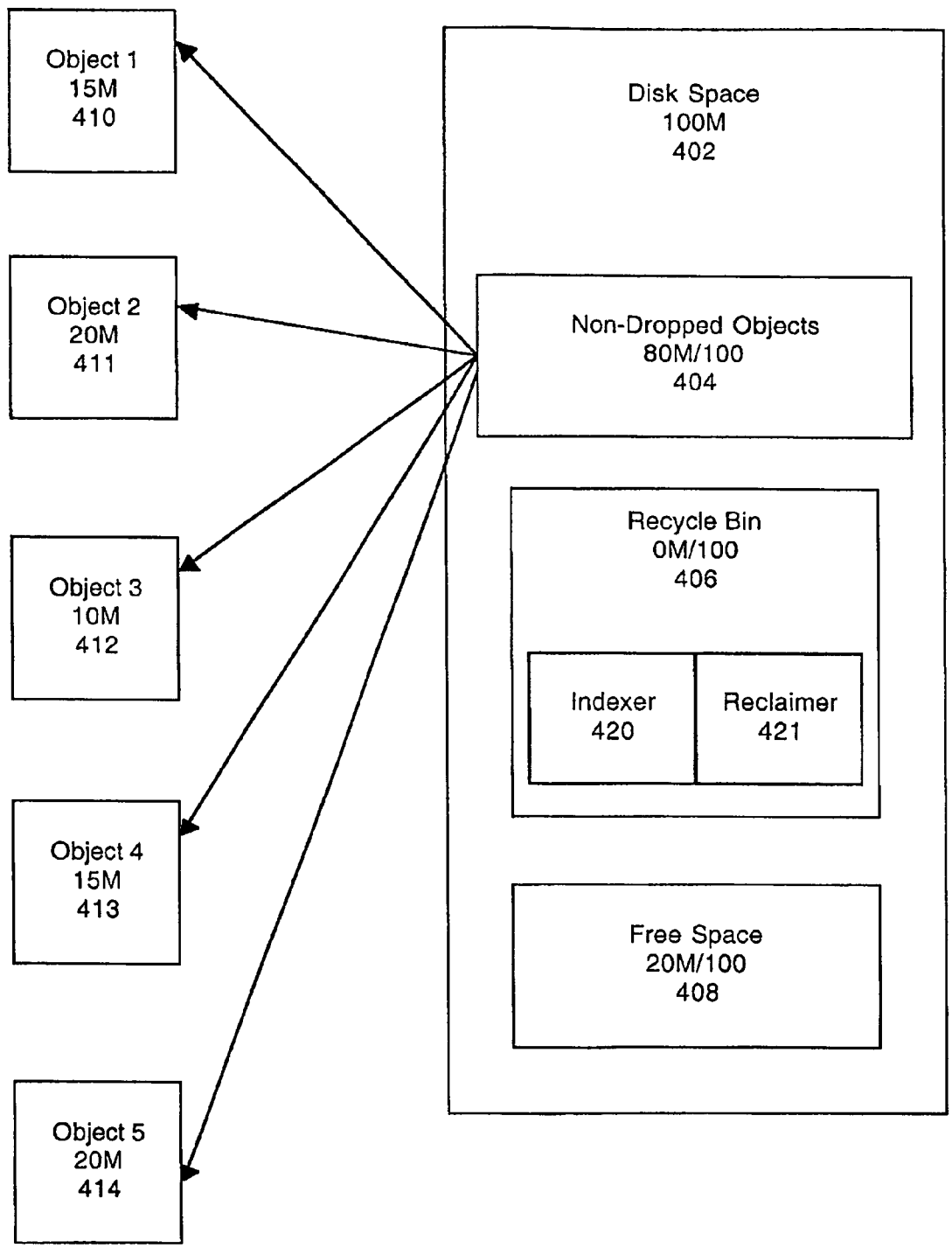
FIG. 4A is a block diagram or map of an exemplary disk space comprising a recycle bin in accordance with embodiments of the present invention.

FIG. 4A is a block diagram or map of an exemplary disk space 402 comprising a recycle bin 406 in accordance with embodiments of the present invention. Disk space 402 comprises, for example, 100 megabytes. Included in the disk space is a portion for non-dropped objects 404. Currently, the non-dropped objects portion comprises 5 objects. Object one 410 is 15 megabytes, object two 411 is 20 megabytes, object three 412 is 10 megabytes object four 413 is 15 megabytes, and object five 414 is 20 megabytes. The total size of the non-dropped objects is 80 megabytes. In this example, the non dropped objects use 80 of the 100 available megabytes on disk space 402. In addition to the dropped objects portion, there is a recycle bin 406, which currently uses zero memory because there are not any objects in it. Since the non dropped objects portion 404 uses 80 of 100 available megabytes, the free space 408 is 20 megabytes.

Figure 4B:
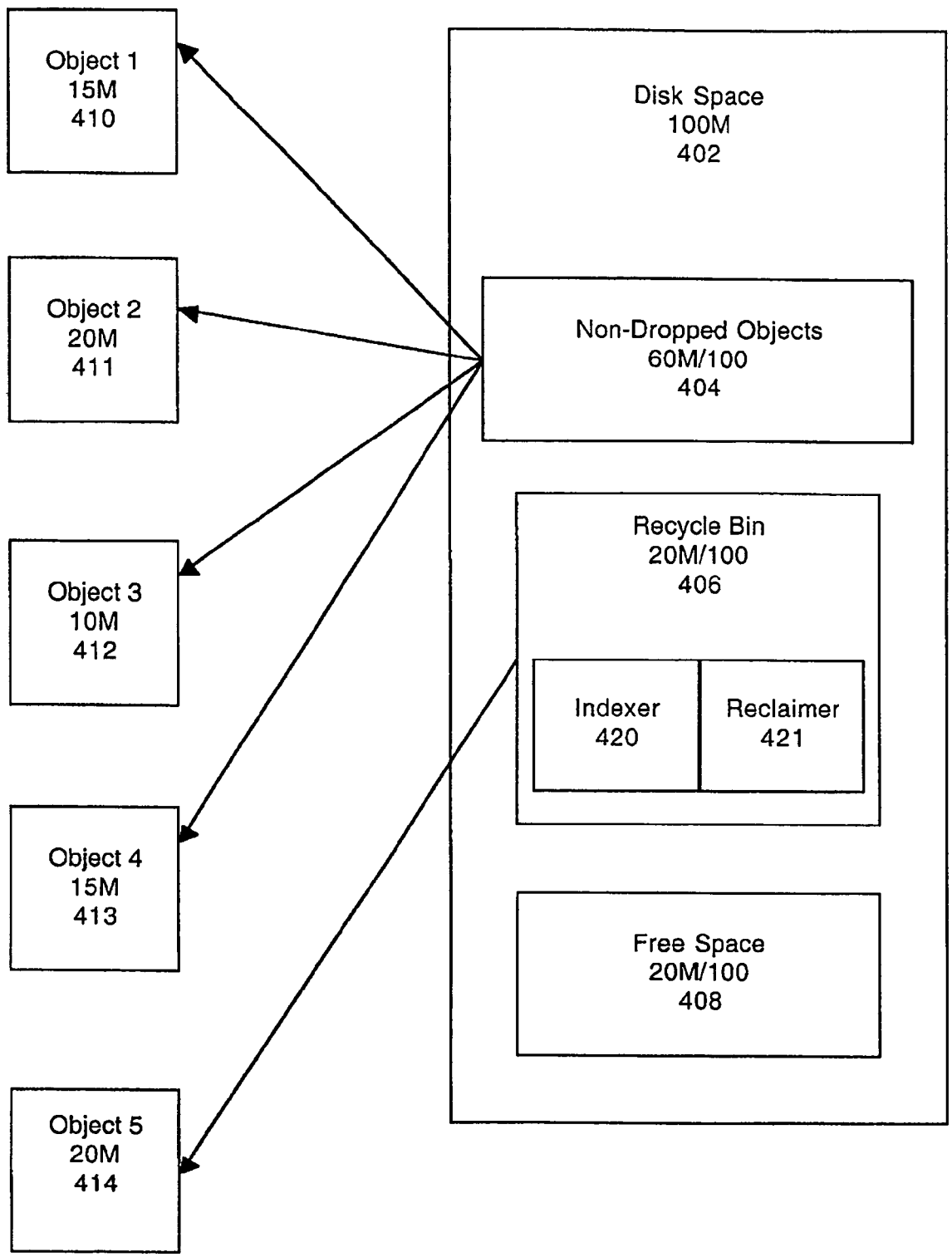
FIG. 4B is a block diagram or map of an exemplary disk space with an object in the recycle bin in accordance with embodiments of the present invention.

FIG. 4B is a block diagram or map of an exemplary disk space with an object in the recycle bin in accordance with embodiments of the present invention. Object five 414 is moved from the non-dropped portion 404 of disk space 402 to the recycle bin 406. Since the size of object five is 20 megabytes, the non-dropped objects portion now uses only 60 megabytes. Furthermore, the recycle bin now uses 20 megabytes. The free space portion 408 did not change because no new objects were added. In one embodiment of the invention, objects are preserved in the recycle bin until there is not any more free space and disk space is needed. In this case, objects are purged from the recycle bin to achieve the desired amount of disk space. In one embodiment of the invention, the oldest objects of the recycle bin are purged first. This is valuable because it allows objects to remain in the recycle bin for the longest period of time and enforces an ordering of object purging from the recycle bin.

Figure 4C:
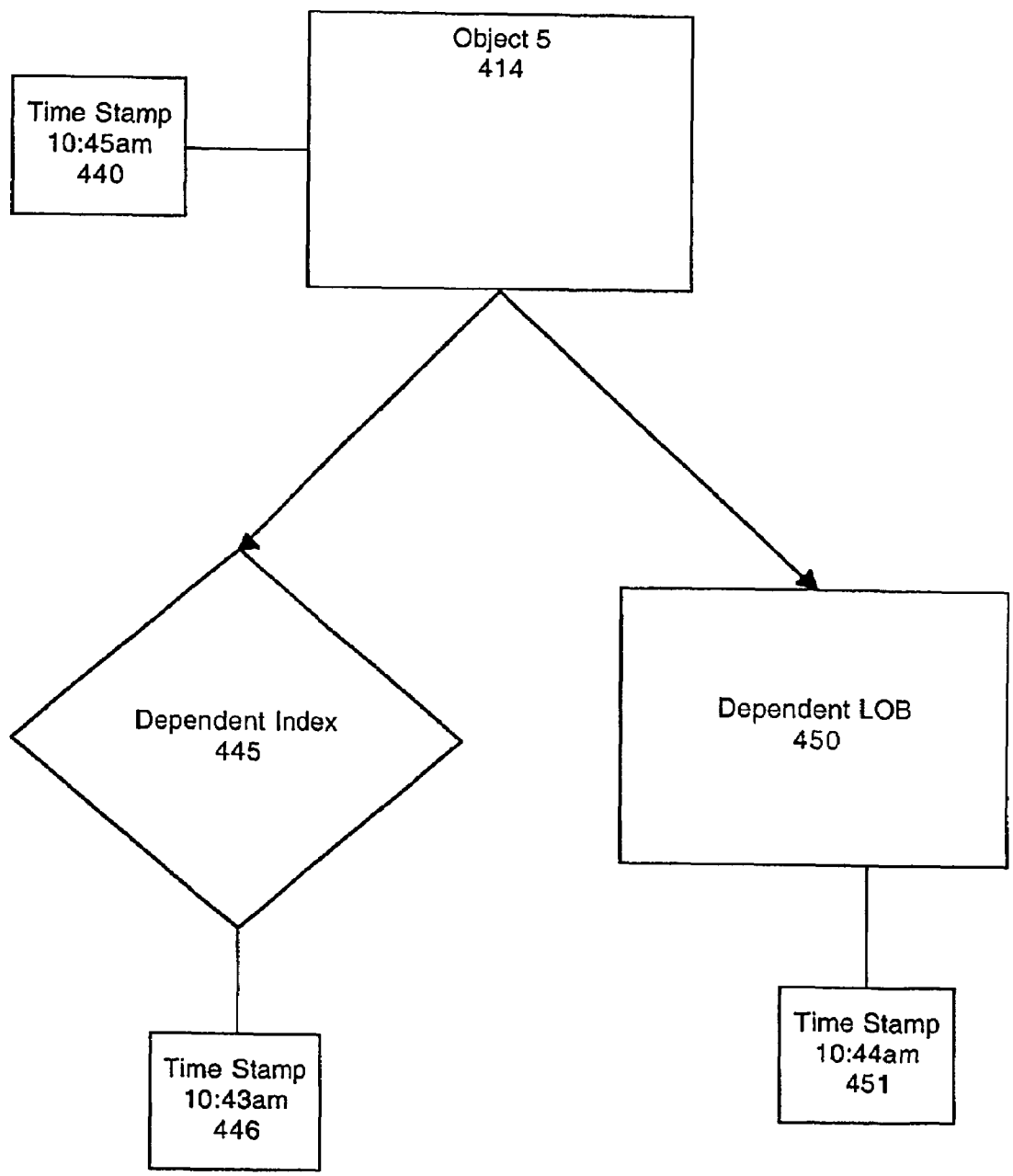
FIG. 4C is a block diagram of an exemplary dropped object and depending objects comprising time stamps in accordance with embodiments of the present invention.

FIG. 4C is a block diagram of an exemplary dropped object and dependent objects comprising time stamps in accordance with embodiments of the present invention. After object five 414 is dropped, all dependent objects are identified. In this example, dependent index 445 and dependent LOB 450 are dependent on object five 414 that could be, for example, a table. Each of the dropped object and the dependent objects are assigned a time stamp so that they can be ordered appropriately in the recycle bin. In one embodiment of the invention, the dependent objects are assigned an earlier time stamp than the table they depend from.

For example, dependent index 445 is assigned a time stamp 446 of 10:43 am. The index is assigned the earliest time stamp because in some cases it can be reconstructed based on the object from which it depends. The dependent LOB 450 is assigned the second earliest time stamp 451 of 10:44 am. Lastly, object five 414 is assigned the newest time stamp 440 of 10:45 am. Assigning the time stamps in this order (dependent objects stamped before the table they depend from) allows the re-creatable objects to be purged first in accordance with the FIFO purging of the recycle bin of the present invention.

Figure 5:
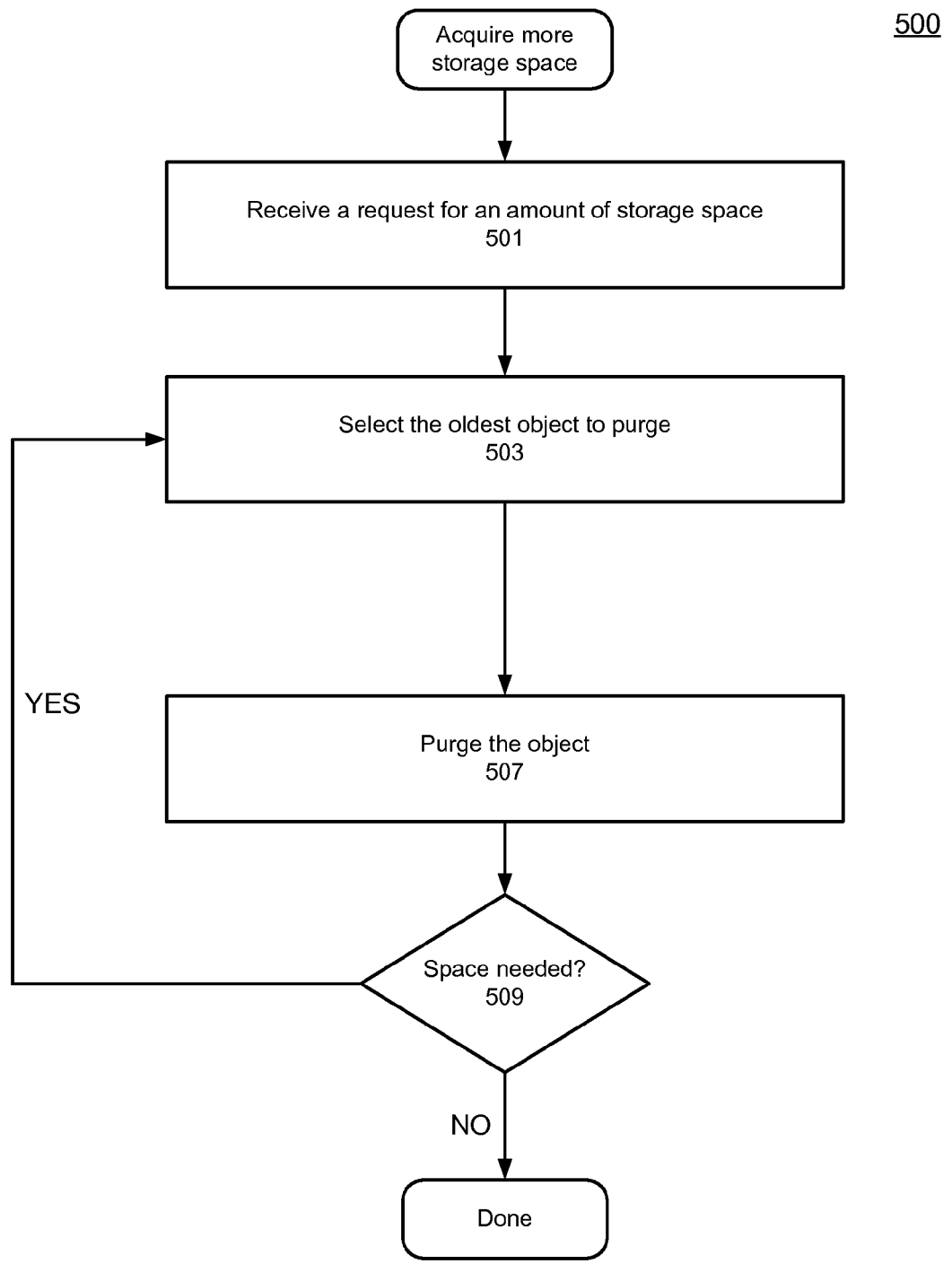
FIG. 5 is a flow diagram of an exemplary computer controlled method for acquiring more disk space by purging one or more objects from a recycle bin in accordance with embodiments of the present invention.

FIG. 5 is a flow diagram of an exemplary method 500 for acquiring more disk space by purging one or more time stamped objects from a recycle bin in accordance with embodiments of the present invention. At step 501, a request or requirement for an amount of storage space is received. The oldest object of the recycle bin is selected to be purged in step 503. In one embodiment of the invention, objects are purged on a page-by-page basis. That is, the dependent objects of a page are purged first, then the page itself is purged. Although in some embodiments, the oldest object is selected, other embodiments can use any number of characteristics to select an object to be purged. For example, a page (e.g., dropped object) may be marked for preservation for a predetermined period of time (e.g., time threshold) and will not be a candidate for purging until that time has elapsed. In this embodiment, the page will not be purged until the time period has elapsed. The oldest object is purged in step 507. In step 509, it is determined if more space is needed. If not, purging is complete and the requested amount of storage is available. If more space is needed, the process continues at step 503 where the oldest object is determined.

With reference to FIG. 6, portions of the present invention are comprised of computer-readable and computer-executable instructions that reside, for example, in computer system 600, which may be used as a part of a general-purpose computer network (not shown). It is appreciated that computer system 600 of FIG. 6 is exemplary only and that the present invention can operate within a number of different computer systems including general-purpose computer systems, embedded computer systems, laptop computer systems, hand-held computer systems, and stand-alone computer systems.

In the present embodiment, computer system 600 includes an address/data bus 601 for conveying digital information between the various components, a central processor unit (CPU) 602 for processing the digital information and instructions, a volatile main memory 603 comprised of volatile random access memory (RAM) for storing the digital information and instructions, and a non-volatile read only memory (ROM) 604 for storing information and instructions of a more permanent nature. In addition, computer system 600 may also include a data storage device 605 (e.g., a magnetic, optical, floppy, or tape drive or the like) for storing vast amounts of data. It should be noted that the software program for outputting information of the present invention can be stored either in volatile memory 603, data storage device 605, or in an external storage device (not shown).

Devices which are optionally coupled to computer system 600 include a display device 606 for displaying information to a computer user, an alpha-numeric input device 607 (e.g., a keyboard), and a cursor control device 608 (e.g., mouse, trackball, light pen, etc.) for inputting data, selections, updates, etc. Computer system 600 can also include a mechanism for emitting an audible signal (not shown).

Furthermore, computer system 600 can include an input/output (I/O) signal unit (e.g., interface) 609 for interfacing with a peripheral device 610 (e.g., a printer, a computer network, modem, mass storage device, etc.). Accordingly, computer system 600 may be coupled in a network, such as a client/server environment, whereby a number of clients (e.g., personal computers, workstations, portable computers, mini-computers, terminals, etc.) are used to run processes for performing desired tasks (e.g., printing, outputting information, etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for managing dropped objects of a database comprising:
  a memory, the memory storing one or more executable instructions;
  a processor in communication with the memory, the processor the one or more executable instructions from the memory and executing the one or more executable instructions, the one or more executable instructions executing components comprising:
    a recycle bin of said database for temporarily storing said dropped objects, said dropped objects are assigned to said recycle bin when dropped, said dropped objects are dropped to indicate that said dropped objects are no longer needed;
    an indexer assigning a time stamp to each of said dropped objects as each of said dropped objects is assigned to said recycle bin, wherein a dropped object of said dropped objects is a database table and wherein said database table comprises dependent objects, wherein said dependent objects are time stamped before said dropped object such that said dependent object is given an older time stamp than said dropped object, wherein said dependent objects comprise a re-creatable object and a non-re-creatable object, and wherein said re-creatable object is time stamped before said non re-creatable object such that said re-creatable object is given an older time stamp than said non re-creatable object; and
    a reclaimer purging said dropped objects from said recycle bin based on said time stamps and disk space requirements;
  wherein said reclaimer cannot purge a dropped object from said recycle bin until said dropped object passes a time threshold.

2. The system as recited in claim 1 wherein said reclaimer purges a dropped object assigned the oldest time stamp first.

3. The system as recited in claim 1 wherein said re-creatable object is an index.

4. The system as recited in claim 1 wherein said reclaimer preserves said dropped objects in said recycle bin until there is not any more free space on a disk space.

5. A computer-implemented method for managing a recycle bin in a database comprising:
  assigning a dropped object of said database to said recycle bin when said dropped object is dropped to indicate that said dropped object is no longer needed wherein said object is a table of said database having associated dependent objects:
  determining the dependent objects associated with said dropped object and assigning said dependent objects to said recycle bin;
  assigning a time stamp to each of said dropped object and said dependent objects
  wherein said dependent objects are time stamped before said dropped object such that said dependent object is given an older timestamp than said dropped object, wherein said dependent objects comprise a re-creatable object and a non-re-creatable object and wherein said re-creatable object is time stamped before said non re-creatable object such that said re-creatable object is given an older timestamp than said non-re-creatable object;

purging said dropped objects from said recycle bin based on said timestamps and disk space requirements; and wherein each of said dropped object and said dependent objects cannot be purged from said recycle bin until each of said dropped object and said dependent objects passes a time threshold.

6. The computer-implemented method as recited in claim 5 further comprising:

purging an object from said recycle bin corresponding to an oldest time stamp.

7. The computer-implemented method as recited in claim 5 wherein one of said dependent objects is an index dependent on said dropped object.

8. The computer-implemented method as recited in claim 5 wherein one of said dependent objects comprises a sound file.

9. The computer-implemented method as recited in claim 5 further comprising:

reclaiming a plurality of objects of said recycle bin depending on their respective time stamps wherein older objects are reclaimed before newer objects to free a predetermined amount of disk space.

10. The computer-implemented method as recited in claim 5 further comprising:

preserving said objects in said recycle bin until there is not any more free space on a disk space.

11. A computer-implemented method of managing information in a data storage system comprising:

assigning a dropped object of said database said recycle bin when said dropped object is dropped to indicate that said dropped object is no longer needed, wherein said dropped object is a table of said database having associated dependent objects;

assigning a timestamp to each of said dropped object and said dependent objects wherein said dependent objects are time stamped before said dropped object such that said dependent object is given an older timestamp than said dropped object, wherein said dependent objects comprise a re-creatable object and a non-recreatable object and wherein said re-creatable object is time stamped before said non re-creatable object such that said re-creatable object is given an older timestamp than said non-re-creatable object;

in response to a request to free storage space of said data storage system, selecting an object of the recycle bin having the oldest timestamp and purging said object from said recycle bin; and repeating said selecting and said purging until said request to free storage space is satisfied;

wherein said object cannot be purged from said recycle bin until said object passes a time threshold.

12. The computer-implemented method as described in claim 11 wherein said dependent objects is an index.

13. The computer-implemented method as described in claim 11 wherein of said dependent objects comprises an image.

14. The computer-implemented method as described in claim 11 wherein said recycle bin is implemented as a dictionary table.

15. The computer-implemented method as described in claim 11 further comprising automatically assigning said dependent objects to said recycle bin in response to dropped object being assigned to said recycle bin.

* * * * *

UNITED STATES PATENT AND TRADEMARK OFFICE
CERTIFICATE OF CORRECTION

| | | |
|---|---|---|
| PATENT NO. | : 7,634,510 B2 | Page 1 of 1 |
| APPLICATION NO. | : 10/959565 | |
| DATED | : December 15, 2009 | |
| INVENTOR(S) | : Vineet Marwah | |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 331 days.

On sheet 3 of 9, in Figure 2B, Box 265, line 2, delete "Reclamer" and insert -- Reclaimer --, therefor.

In column 1, line 11, before "assigned" delete ",".

In column 4, line 55, delete "binary," and insert -- binary --, therefor.

In column 8, line 64, delete "timestamp," and insert -- time stamp --, therefor.

In column 10, line 7, delete "timestamp," and insert -- time stamp --, therefor.

In column 10, line 9, delete "non-recreatable," and insert -- non-re-creatable --, therefor.

In column 10, line 11, delete "non re-creatable," and insert -- non-re-creatable --, therefor.

In column 10, line 25, in claim 13, after "wherein" delete "of".

Signed and Sealed this

Fourteenth Day of September, 2010

David J. Kappos
*Director of the United States Patent and Trademark Office*